United States Patent
Cane et al.

(10) Patent No.: US 7,774,073 B2
(45) Date of Patent: Aug. 10, 2010

(54) MODULAR PROGRAMMABLE AUTOMATION CONTROLLER WITH MULTI-PROCESSOR ARCHITECTURE

(75) Inventors: Gary R. Cane, Phoenixville, PA (US); Andres Lebaudy, Bryn Mawr, PA (US); Jay Stolzenberg, Philadelphia, PA (US); Patrick J. Kelsey, Manheim, PA (US)

(73) Assignee: Fairmont Automation Inc., Newton Square, PA (US)

( * ) Notice: Subject to any disclaimer, the term of this patent is extended or adjusted under 35 U.S.C. 154(b) by 1316 days.

(21) Appl. No.: 11/085,605

(22) Filed: Mar. 22, 2005

(65) Prior Publication Data

US 2005/0220127 A1   Oct. 6, 2005

Related U.S. Application Data

(60) Provisional application No. 60/554,905, filed on Mar. 22, 2004.

(51) Int. Cl.
*G05B 19/18* (2006.01)
*G06F 15/16* (2006.01)

(52) U.S. Cl. .............................. 700/3; 709/208; 714/43

(58) Field of Classification Search .................. 700/3, 700/4; 370/440; 713/323; 714/43; 710/302; 709/208, 209
See application file for complete search history.

(56) References Cited

U.S. PATENT DOCUMENTS

| | | | |
|---|---|---|---|
| 2,871,457 A | 1/1959 | Jencks et al. | |
| 5,747,734 A | 5/1998 | Kozowski et al. | |
| 6,301,095 B1 | 10/2001 | Laughlin | |
| 6,418,492 B1 * | 7/2002 | Papa et al. ................... | 710/302 |
| 6,449,732 B1 | 9/2002 | Rasmussen et al. | |
| 6,487,623 B1 * | 11/2002 | Emerson et al. ............. | 710/302 |
| 6,591,324 B1 * | 7/2003 | Chen et al. ................... | 710/302 |
| 6,742,136 B2 | 5/2004 | Christensen et al. | |
| 6,754,846 B2 | 6/2004 | Rasmussen et al. | |
| 6,754,885 B1 | 6/2004 | Dardinski et al. | |
| 2005/0060490 A1 * | 3/2005 | Lu ............................. | 711/115 |
| 2005/0132113 A1 * | 6/2005 | Griessbaum ................ | 710/110 |
| 2005/0262395 A1 * | 11/2005 | Yang et al. .................... | 714/25 |

* cited by examiner

*Primary Examiner*—Paul L Rodriguez
*Assistant Examiner*—Sheela Rao
(74) *Attorney, Agent, or Firm*—Blank Rome LLP

(57) ABSTRACT

An apparatus and method for forming a control node in a programmable architecture, is disclosed. The node includes a plurality of user-programmable, microprocessor-based modules connected together. The modules are connected to create a parallel-processing environment with a selected functionality. Hot-swapping of the modules can be determined in the node. Power is distributed throughout the modules in the node. The modules may be automatically programmed to accommodate a target independent device.

23 Claims, 8 Drawing Sheets

WIRING HUB WITH CURRENT
SOURCE AND SINKS CIRCUITRY

MODULAR PROGRAMMABLE AUTOMATION CONTROLLER WITH MULTI-PROCESSOR ARCHITECTURE

RELATED APPLICATION

The present application claims priority to U.S. Provisional Application Ser. No. 60/554,905, filed Mar. 22, 2004.

FIELD OF THE INVENTION

The present invention is generally related to control and, more particularly, to an apparatus and method for forming a control node using programmable modules.

BACKGROUND OF THE INVENTION

The terms control and control systems generally refer to the control of a device, process or system by monitoring one or more of its characteristics. This is used to insure that output, processing, quality and/or efficiency remain within desired parameters over the course of time. In many control systems, digital data processing or other automated apparatus monitor a device, process or system and automatically adjust its operational parameters. In other control systems, such apparatus monitor the device, process or system and display alarms or other indicia of its characteristics, leaving responsibility for adjustment to the operator.

Control is used in a number of fields. Process control, for example, is typically employed in the manufacturing sector for process, repetitive and discrete manufactures, although, it also has wide application in utility and other service industries. Modern day control systems typically include a combination of field devices, control devices and controllers, the functions of which may overlap or be combined. Field devices include temperature, flow and other sensors that measure characteristics of the device, process or system being controlled. Control devices include valves, actuators, and the like, that control the device, process or system itself.

Controllers generate settings for the control devices based on measurements from the field devices. Controller operation is typically based on a control algorithm that maintains a control system at a desired level, or drives it to that level, by minimizing differences between the values measures by the sensors and, for example, the set-point defined by the operator. Controllers may be networked or otherwise connected to other computing apparatus that facilitate monitoring or administration. At the lowest level of the hierarchy are control modules that directly manipulate field devices. At a higher level, equipment modules coordinate a function's control modules as well as other equipment modules and may execute phases of the manufacturing process (such as setting controller constants and modes). Units, at a still higher level of the hierarchy, coordinate the functions of equipment and control modules. Process cells orchestrate all processing activities required to produce a manufacturing batch, scheduling, preparing and monitoring equipment or resources, and so forth.

The principal function of controllers is executing control algorithms for the real time monitoring and control of devices, processes or systems. They typically have neither the computing power nor user interfaces required to facilitate the design of a control algorithm. Instead, the art has developed general purpose computers (work stations) running software that permit an operator to graphically model a device, process or system and the desired strategy for controlling it. This includes enumerating field devices, control devices, controllers and other apparatus that will be used for control, specifying their interrelationships, and the information that will be transferred among them, as well as detailing the calculations and methodology they will apply for purposes of control. Once a model is complete and tested, the control algorithm is downloaded to the controllers.

Historically, the process control industry has used manual operations such as manually reading level and pressure gauges, turning valve wheels, and so forth, to operate the measurement and control field devices within a process. With the emergence of the microprocessor-based distributed control system (DCS), distributed electronic process control became prevalent in the process control industry. A DCS includes an analog or a digital computer, such as a programmable logic controller, connected to numerous electronic monitoring and control devices, for example, electronic sensors, transmitters, current-to-pressure transducers, valve positioners, and so forth, located throughout a process. The DCS computer stores and implements a centralized and, frequently, complex control scheme to effect measurement and control of devices within the process to thereby control process parameters according to some overall control scheme.

Usually, however, the control scheme implemented by a DCS is proprietary to the DCS controller manufacturer which, in turn, makes the DCS difficult and expensive to expand, upgrade, reprogram and service because the DCS provider must become involved in an integral way to perform any of these activities. Furthermore, the equipment that can be used by, or connected within, any particular DCS may be limited due to the proprietary nature of the DCS controller and the fact that a DCS controller provider may not support certain devices or functions of devices manufactured by other vendors.

The controllers communicate with the devices via input/output (I/O) devices. The I/O devices implement the communications protocol used in the process control network, and control the communications between the controllers and the devices on the segments. Although the I/O devices facilitate the communications between the controllers and the devices on the segments, process control ceases, at least with respect to devices on a particular segment, if the I/O device for the segment goes out of service for whatever reason.

The impact of a disabled I/O device and disruption to process control may be reduced by providing a backup I/O device that is connected to a segment that takes over for the disabled I/O device. However, the transition from the disabled I/O device to a backup I/O device is not without complications, and disruption in the process control still occurs. Currently known backup I/O devices are not updated with the current information stored in the primary I/O device, such as current values of process variables, functional software that may reside in the I/O device, the communication schedules for the devices on the segment, and so forth. Also, in some implementations, the backup I/O device does not automatically assume control when the primary I/O device becomes disabled, resulting in a delay in performing process control until a user activates the backup I/O device. In addition, in some protocols, the devices are configured to communicate specifically with the primary I/O device and must be reconfigured to communicate with the backup I/O device before the backup I/O device can take over communications on the segment.

A controller node is constructed by combining modules with selected functionality into one device. In general, a modular architecture allows the selection of hardware capabilities to strictly match the specific requirements of a particular application without compromising future expansion needs.

Current modular solutions usually require that one build a device by selecting a single, main processing module, a single power module, various optional expansion input/output (I/O) modules, and a single optional networking module. However, with this arrangement, the single processing module bears an increasing computational burden as modules are added, since the aggregate device cannot have multiple processing modules working in parallel. Thus, an unaddressed need exists in the industry to address the aforementioned efficiencies and inadequacies.

SUMMARY OF THE INVENTION

Embodiments of the present invention provide an apparatus and method for forming a control node for controlling a process control system. Briefly described, in architecture, a preferred embodiment of the invention can be implemented as follows. A node is created by connecting one or more self-contained microprocessor-based modules and their associated sets of hardware resources. Each module includes an independently operating, user-programmable microprocessor and its individual associated set of hardware resources. The modules and their associated sets of hardware resources are connected in such a manner to create a parallel-processing environment with a selected functionality. Within the parallel-processing scheme, a master module is selected. Mechanisms are provided for determining the address of each module in the node and detecting whether the module has been hot-swapped into or out of the node. The modules in the node can be programmed as target independent. A mechanism is provided for distributing power to the modules in the node.

Embodiments of the present invention can also be viewed as providing an apparatus for the aforementioned preferred embodiment of the invention. In that regard, one embodiment of such an apparatus, among others, can be described as a programmable automation controller with a multi-processor architecture.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components of the drawings are not necessarily to scale, emphasis instead being placed upon clearly illustrating the principles of the present invention. Moreover, in the drawings, like reference numerals designate corresponding parts throughout the several views.

DESCRIPTION OF THE PREFERRED EMBODIMENTS

Figure 1:
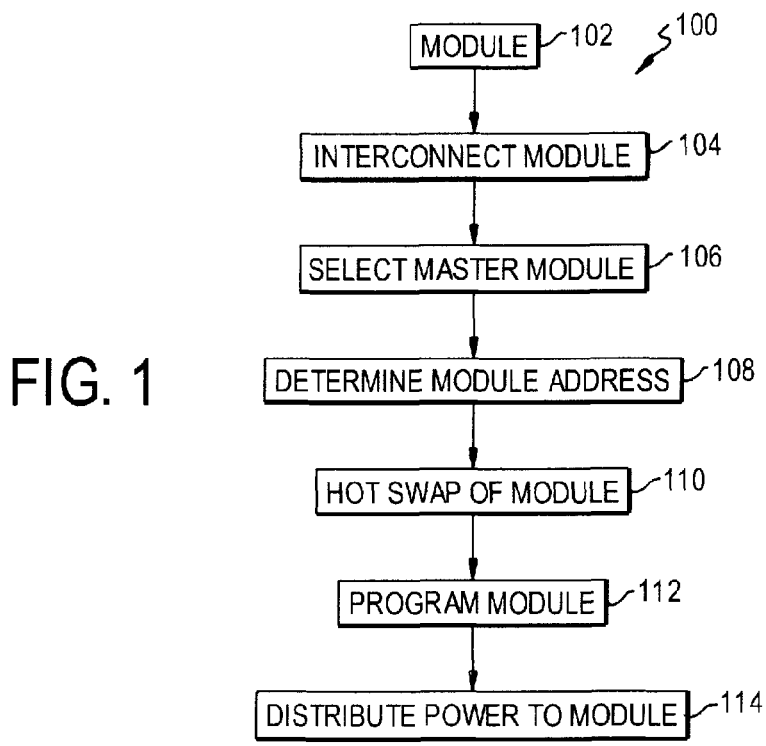
FIG. 1 is a block diagram of an embodiment of the invention.
Figure 2:
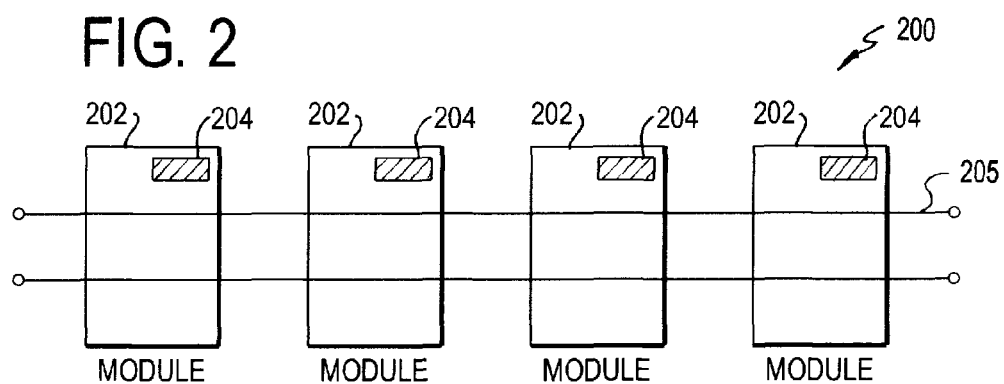
FIG. 2 is a schematic diagram of a parallel arrangement of the modules in a node.

FIG. 1 illustrates a block diagram of a preferred embodiment of the node process 100. At least one module 302, 304, 306, or 308 (FIGS. 2, 3, and 5) is provided at step 102, and includes its associated set of hardware resources and a user-programmable microprocessor 204 (FIG. 2). The node 200 (FIGS. 2, 3, and 5) is constructed by interconnecting one or more of the microprocessor-based modules 302-308 at step 104 and forming a parallel-processing environment with a selected functionality. The modules 302-308 are housed in an assembly having watertight housings 202 (FIG. 2) that can be interconnected and permit the modules 302-308 to be interconnected at step 104 in accordance with the device and methods disclosed in U.S. patent application Ser. No. 11/085,232, now U.S. Pat. No. 7,476,802, entitled "Programmable Automation Controller Assembly", which claims priority to U.S. Provisional Application Ser. No. 60/554,915, the contents of which are incorporated herein.

The modules 302-308 preferably each include an active board and a wiring hub board. The majority of electrical components, such as microprocessors, memory, and power circuits, are located on the active board and have the highest probability of failure. The active boards contain the Node Position Actuator (NPA) switch 312 and the Node Sense Actuator (NSA) switch 502, circuitry required to read voltages 314, 316, 318, 320, and all the active components that interact on the backplane (such as microprocessors, communication drivers, inputs, and outputs).

The wiring hub can be thought of as the interface for the active board. The components found on the wiring hub are mainly connection points that field wiring can be attached to. In general, the wiring hub contains a current source 322, resistor chain 310, and a grounding point 324. The wiring hub also contains a set of wires that interconnect to other modules and form the wires that construct a backplane. At the very minimum, a module has a wiring hub since the active board does not need to be present for adjacent modules (which have both the wiring hub and active boards) to recognize there is a slot present.

Each module is equipped with its own processor and memory so that processing power and memory storage capacity grows proportionally with I/O, networking and user-interface capabilities as modules are added to the node. The processing load is distributed across the modules so that only the resources contained within that module become inaccessible in the event of a failure. The boards can be configured to execute redundant algorithms, so that if one fails another can take over its control functions. There can also be redundancy in power sources, to the PLC or PAC and to the external devices that it powers. The boards share information over a common high-speed data bus, so that the hardware resources (e.g., inputs, outputs, displays, buttons, etc.) at one module is available to all the boards.

Figure 3:
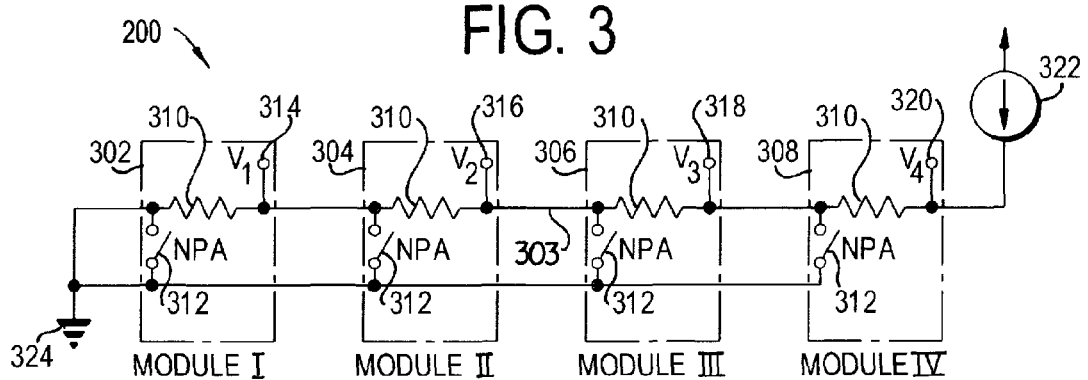
FIG. 3 is a schematic diagram of the node illustrating node position actuators.

The system is able to select a master module in the node 200 at step 106 (FIG. 3). Once determined, the selected master module facilitates the determination of the addresses, at step 108, of the modules 302-308 that form the node 200. The system also determines (FIG. 5), at step 110, if the master module's active board has been hot-swapped into or out of the node 200. The modules 302-308 in the node 200 can be automatically programmed at step 112 using a node configuration file that may be distributed (FIG. 8) to every module 302-308 on power up, and can be stored in the non-volatile memory of the modules 302-308. Power distribution (FIG. 9) throughout the modules may be accomplished at step 114 by applying power to one or more pre-regulating modules and having the other modules in the node 200 post-regulate the power from the pre-regulators to make it available to power-consumers specific to that module.

Selecting a Master Module (106) and Determining Module Address (108)

In the preferred embodiment of FIG. 2, the node has a plurality of modules 302-308 that communicate with one another via a single multi-drop serial channel. Each module 302, 304, 306, and 308 is enclosed in a housing 202 that protects the module 302, 304, 306, and 308 from harsh environments, as disclosed more fully in the co-pending application. Because all of the modules 302-308 share the same channel, only one module 302, 304, 306, or 308 may transmit at a time. To accomplish this, one of the modules 302, 304, 306, or 308 will be designated as the master module. Among other duties, this master module can initiate all communication ("Speak when spoken to"), guaranteeing that only one of the modules 302, 304, 306, or 308 transmits at a time.

By convention, as shown in FIG. 3, the master module is preferably chosen to be an end module in the node 200 and, more specifically, the rightmost module 308 in the node 200 (though the master module can also be the leftmost module 302 in the node 200, or any other module 304 or 306 in the node 200). Even more specifically, the master module is the rightmost module 308 with a 'living' active board in the node 200, so that if the rightmost module's 308 active board is removed, or has failed due to some hardware or software problem, the master module should now be the module directly to its left, and so forth. In FIG. 3. the master module is the rightmost module 308.

Master Negotiation Basics

One function of the invention is to guarantee that there is one (and only one) master module 308 on the node 200 at any one time, which is referred to as Master Negotiation. For example, if the current master module 308 should fail due to a hardware problem, another module 302-306 must automatically and transparently assume the throne as the new master. The invention is able to achieve hot-swapping so that if a module's 302, 304, 306, or 308 active board needs to be replaced in the node 200, it can be removed from the node without removing power. In addition, if one of the module's 302, 304, 306, or 308 active board goes bad in the node 200, then that module(s) must not prevent the remaining modules from functioning, though the functioning may be reduced if the remaining modules use resources of the bad module.

Master Negotiation would be relatively simple if there were an unlimited number of signals available on the backplane 205. The backplane 205 is generally a collection of signal lines and power lines that electrically connect one module to one or more of its neighbors. Most backplane signals transition the node from one side to the other. In accordance with the preferred embodiment, the backplane signals consist of 20 lines: RS-485 communication lines (1-3 lines); power, signal ground, and chassis ground (10 lines); the node position resistor chain (NPC) (1 line); power status lines (1 line); miscellaneous signaling lines (3 lines); and lines used to figure out if the module is leftmost or rightmost in the node (2 lines).

If, for example, there is a dedicated "I'm alive" signal to every module 302-308, the negotiation process might be simplified by providing that each module 302, 304, 306, and 308 individually check to see if anyone to its right was alive, and assume the role of master if none were found. However, the number of signals grows with the number of modules in the node 200, increasing the size of cables and connectors, and consuming precious I/O. Preferably, the architecture is designed to work with a minimum of signals, and the number of signals required does not increase as more modules are added to the node 200. This design simplifies the cabling and reduces I/O requirements.

As shown in FIG. 3, a Node Position Chain (NPC) 303 extends across the backplane 205 (i.e., NPC 303 is one of the wires of the backplane 205) and is used to determine which module is the master module and the position of the module. The NPC is dedicated to module position determination and hot-swap maintenance. Preferably, node positions (also known as the "module ID" or "module address") are numbered starting from the left with 1. Thus, in the embodiment of FIG. 3, module 302 is assigned node position 1, module 304 is assigned node position 2, module 306 is assigned node position 3, and module 308 is assigned node position 4.

The NPC 303 includes an array of series-connected resistors 310, with one resistor per module 302-308. The leftmost end of the array is grounded at 324, and a constant current source 322 is connected to the right. The NPC 303 is permanent in the node 200, and if a module's 302-308 active board is removed, that module's 302-308 associated NPC circuitry remains in the underlying structure.

Figure 12:
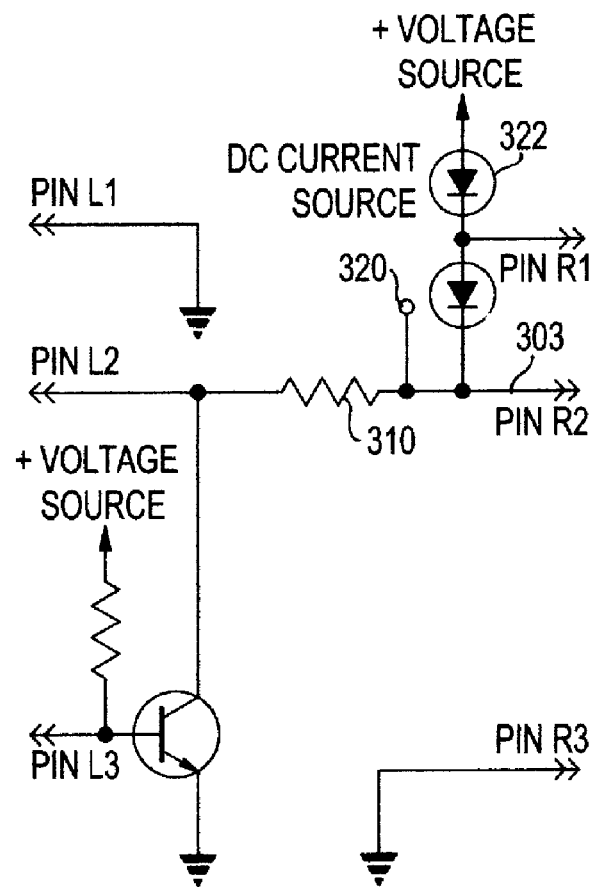
FIG. 12 is a circuit diagram showing a wiring hub.
Figure 13:
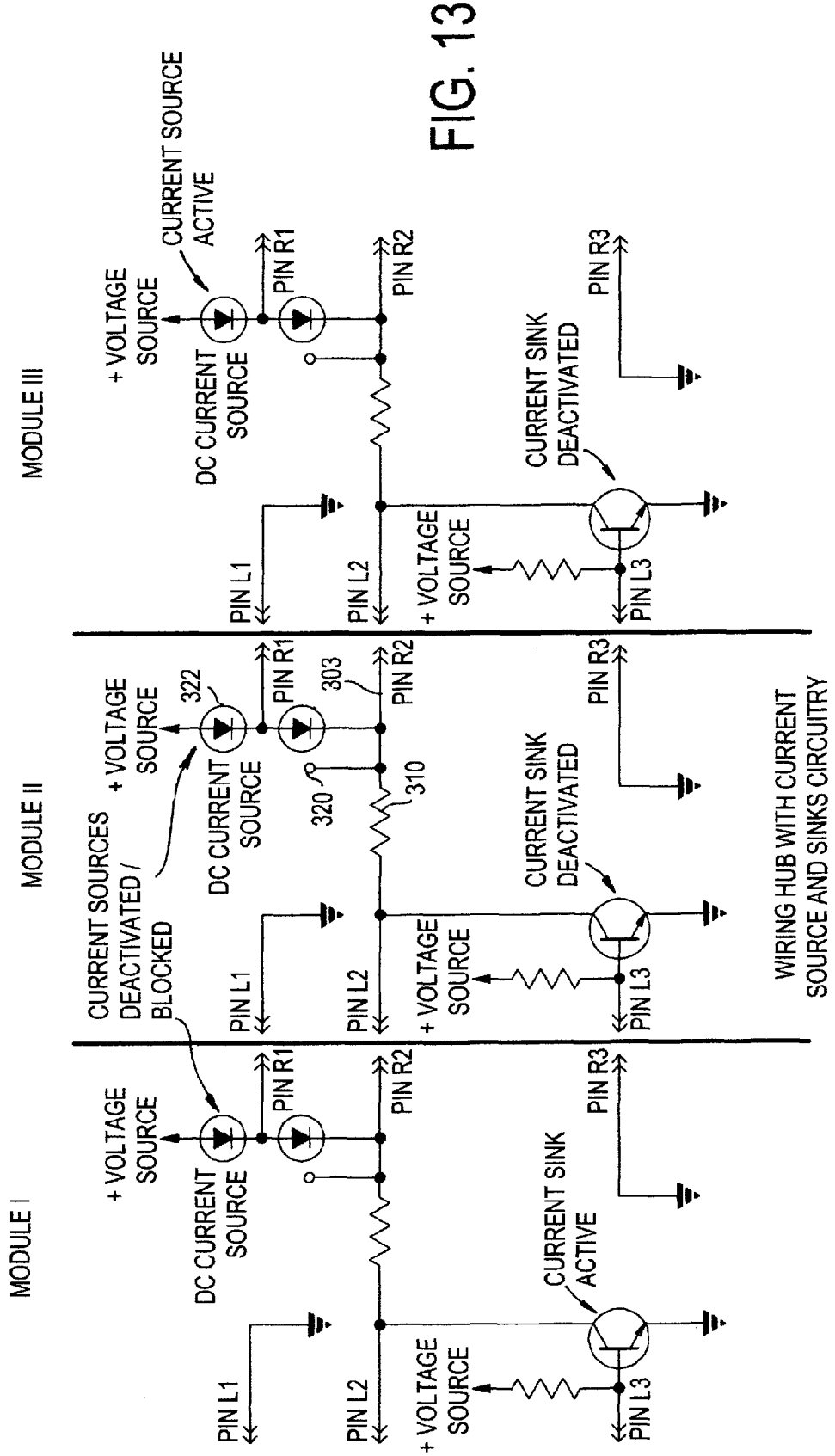
FIG. 13 is a circuit diagram showing wiring hubs connected together.

The current source 322 and ground connections 324 are controlled automatically by the electrical hardware of the backplane. Specifically, the rightmost module 308 is automatically connected to an on-board current source 322, and the leftmost module 302 is automatically connected to ground, without any software intervention. The circuitry of a wiring hub includes a current source 322 and a current sink transistor, as shown in FIG. 12. When wiring hubs are joined together (FIG. 13) the pins L1, L2, and L3 on the left are connected to corresponding pins on its left-side neighbor wiring hub (labeled R1, R2, and R3) through the backplane 205, which preferably is a ribbon cable. A connection to a wiring hub on the right can be made in a similar manner.

When these adjacent connections are made, current sinks and sources are automatically activated and deactivated. The end result is that the leftmost current sink transistor is the only one still active by the pull-up resistor on its base, and all others have their base control signal turned off via the ground connection on L3/R3. Similarly, the rightmost current source is the only one active, and all others are blocked to a short to ground via R1/L1 ground connections.

Each module 302, 304, 306, and 308 in the node 200 has the ability to read the voltage on the NPC 303 (labeled in FIG. 3 as $V_1$, 314; $V_2$, 316; $V_3$, 318; $V_4$, 320; . . . $V_n$), which is measured at the right-hand side of the resistor 310 located in the module. An A/D converter is used on the active boards to measure this voltage on the wiring hubs.

Master Detection

The backplane includes signal lines that are dedicated to communications, and specifically multi-drop RS-485 networking. A communication channel is used that does not resolve collisions and requires a mediator (i.e., a master). Accordingly, the master must be selected 106 without communication between the modules in the node 200. Each module 302, 304, 306, 308 is provided with a software-controlled switch 312, called the "Node Position Actuator" (NPA), that is used with the NPC 303. The NPA 312 is normally open. Closing the NPA 312 prevents any current (and therefore voltage) from reaching any module located to the left of the module having the closed NPA 312. Closing the NPA grounds the resistor chain (i.e., 0 volts) at that point and all points to its left. Current travels from the right-most modules current source, through all the resistors in the resistor chain, and to ground at either the left-most module (if no NPA switches are closed) or down the first NPA reached to ground.

Accordingly, if a module reads a voltage on the chain 303, then there can not be any module to its right that has closed its NPA 312. If all of the modules close their respective NPA 312 at the same time, only the rightmost one will have a voltage reading. The module with the voltage is determined to be the master module. In this way, the master module can be selected without having to send any messages.

This master module selection 106 works whether or not there are 'dead' active modules within the node 200. Assume, for instance in FIG. 3, that Module IV 308 is removed or otherwise inoperative, and that Modules I-III 302, 304, 306 are alive. Since the NPA 312 for Module III 306 is closed, Modules I 302 and II 304 will not read any voltage. Module III 306 will read a voltage and can safely (and correctly) assume the role of master.

Another feature of this process 106 is that the master will be able to accurately sample the value of the current times the resistance (i.e., the voltage). Assuming very accurate resistors are used, this reading will allow one to cancel out the effect of variation in the current source due to time, temperature, etc. By measuring the voltage and knowing the resistance is not going to change significantly with temperature, the current is determined as I=V/R. This technique allows a simple current source design to be used that can be allowed drift and still have the mechanism work properly. The master will therefore sample this value and remember it for later.

Node Position Detection

A module 302, 304, 306, or 308 can use the array of series-connected resistors 312 in the NPC 303 to detect its position in the node 200 in accordance with the following: Position=Voltage Per Module/(I*R). Since the current source 322 is allowed to vary significantly with time, temperature, part, etc., a variation of even 10% can yield an error of +/−1 position in a node of ten modules. To compensate for this, the actual voltage drop across a single module, Voltage Per Module (VPM) measured by the master is transmitted to the other modules, effectively canceling out the effect of current variation. The VPM is preferably transmitted over the RS-485 backplane communication network, or in any suitable manner.

Figure 4:
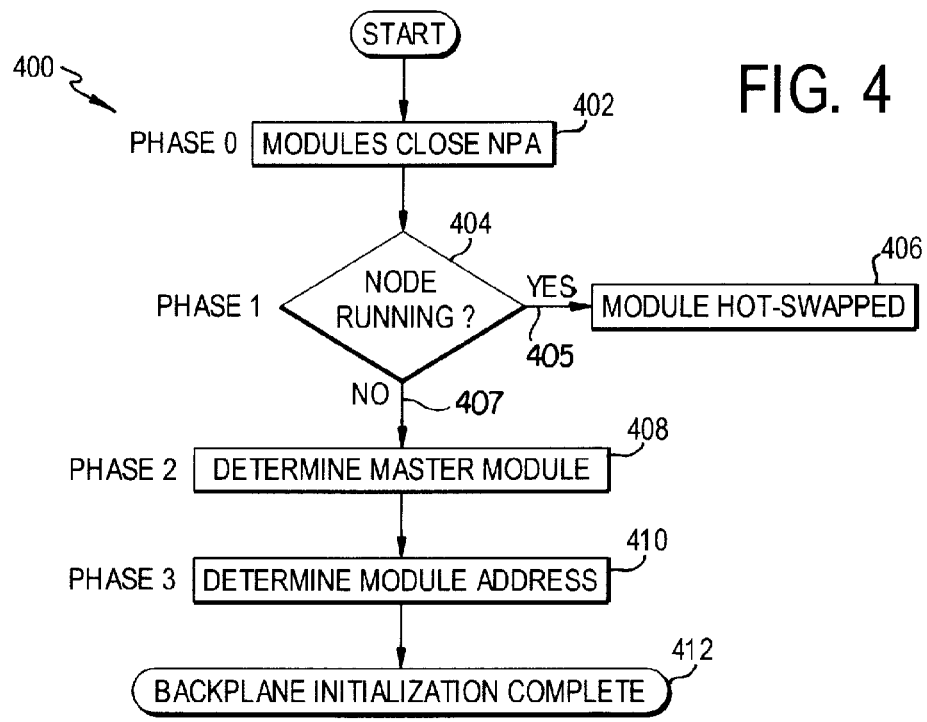
FIG. 4 is a flow diagram of a module start-up sequence.

Module Start-Up Sequence, FIG. 4

FIG. 4 illustrates a module start-up sequence 400 in accordance with the preferred embodiment of the invention. At Phase 0, startup, one of the first things that the modules do upon startup is to close their node position actuators 312 at step 402. Closing the NPAs 312 as early as possible guarantees that all the NPAs 312 will be closed in time, even if some of the modules take longer to initialize than others. At PHASE 1, step 404, each of the modules 302, 304, 306, and 308 in the node 200 monitors the RS-485 communication channel on backplane 205 for a period of time, typically on the order of a second depending on the implementation to determine if there is any activity on the node 200.

If there is any activity on the node 200, step 405, then the node 200 is already running and the module knows that it must have been hot-swapped at step 406 (as discussed in the "hot swap" section below). In the case where the node 200 has just been powered up, there will be no activity on the communication channel, step 407, and execution moves directly to Phase 2 to determine which module is the master and to prepare for the modules to determine their positions within the node 200, step 408.

All of the NPAs were closed at step 402 of Phase 0. Accordingly, at step 408, the modules will read the voltage on the chain. The slave modules will read approximately zero volts, and the master module will read a voltage greater than zero. If a module is a slave, it will wait indefinitely for instructions from the master. The first thing the master does is to store its NPC reading, which should be equal to the Voltage Per Module (VPM). Since all of the NPA switches 312 are closed, the current travels from the rightmost module 308 across the resistor chain and down the NPA 312 of the master. So, the master is reading the voltage across its own resistor in the resistor chain to ground, which is essentially the voltage across one module.

The next thing it does is to wait in order to ensure that all of the modules have reached Phase 2 before proceeding. The waiting period may vary depending on the microprocessors being used and the time it takes them to boot. The waiting period is longer than the maximum time it takes for a microprocessor to boot up. That is because different modules can take different amounts of time to initialize and modules must sample their voltage while all the NPAs 312 are closed. Otherwise, they would get invalid readings, and the node 200 could end up with multiple masters.

After the delay has expired, the master will release (open) its node position actuator 312 and broadcast a message over the RS-485 network line(s) of backplane 205 instructing all of the slaves in the node 200 to do the same. The slave modules, which are still waiting, will receive the broadcast message and release their node position actuators 312 accordingly. Finally, the master will broadcast a command to the slaves to find their node position and the value of VPM sampled earlier by the master module. The slaves can all determine their positions simultaneously, provided that all the NPAs have been released.

The system now enters Phase 3, whereby the modules determine their addresses, step 410. All the node position actuators 312 should be released (open) such that a module can determine its position. The last thing that happened in Phase 2, step 408, was that the master sent a message to the modules to find their respective node positions. Depending on the type of module, that will trigger one of two actions. Upon receiving the above message, the slave modules measure their node position voltage, divide it by the Voltage Per Module (VPM) that was received in the message, and determine its node position. Upon sending the above message, the master module will also measure its node position voltage, and calculate its node position. It will then initiate any subsequent steps, such as distributing the node configuration file to the other modules.

At this point, there should be exactly one master, and all modules in the node should know their positions. Backplane Initialization is now complete, step 412. It should be noted that all of the main boards on adjacent modules need not be present for the algorithms to work. That is, the active boards need not be present since all the required circuitry is located on the wiring hub boards, which are always present.

Hot-Swapping Modules (110)

Hot-swapping generally refers to the action of inserting or removing a module's active board while the node 200 is powered up and functioning. The hot-swap mechanism can be broken down into three areas: module active board insertion, master module active board removal, and slave module active board removal.

Figure 6:
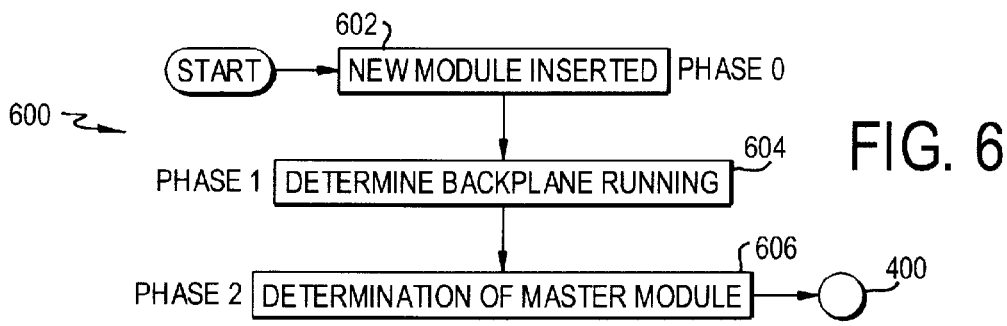
FIG. 6 is a flow diagram depicting module insertion.

Module Insertion, FIG. 6

Figure 5:
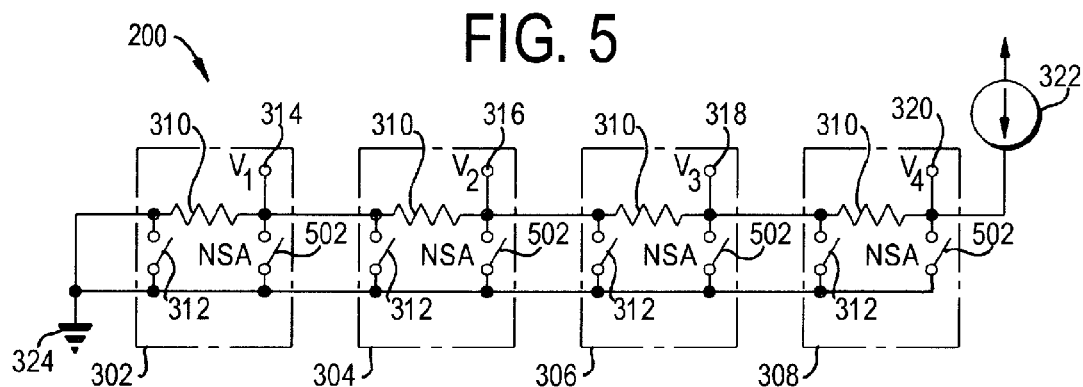
FIG. 5 is a schematic diagram of the node illustrating node sense actuators.

The circuitry shown in FIGS. 3 and 5 is on the wiring hubs, which does not change in a hot-swap situation. Hot-swap is the addition or removal of the associated active boards in a module, while the underlying circuitry (i.e., on the wiring hub) remains present and connected in the node 200 even if the active board is missing. If an entirely new module (i.e., wiring hub and active board) is to be added to the node 200, the power is removed, the module is inserted, and the power is turned on. This is not a hot-swap situation since the power is removed. In this case, the power-up sequence of FIG. 4 is followed to determine the master module.

During Module Insertion, the existing node master will be able to detect when a new active board of a module is inserted. It does this by monitoring the voltage on its part of the Node Position Chain 303 and looking for a change in that voltage. For illustrative purposes, referring to FIG. 5, assume that the master module is the right-most live module 306 in the node 200. If a new module (i.e., active board) is hot-swapped into an empty slot 308 to the right of the master, the new module will be the new right-most module in the node 200.

Recall that upon power up, the active board closes their respective Node Position Actuator 312. Accordingly, the newly inserted module will close its NPA 312, which will pull down the node position chain voltage to zero, causing all of the other modules in the node to read zero on their node position voltage. Since the other modules continue to have power, they do not close their NPA 312. Thus, the modules to the left of the inserted module will see about 0 volts on its node position voltage, regardless of the position of its NPA 312. All the current from the current source in FIG. 3 flows down the NPA of the inserted module to ground, and all the resistors to the right of this NPA in the chain will have 0 current and 0 voltage across them. So, if the master module 306 detects the node position voltage change to zero, it knows a new module has been hot-swapped to its right 308 and eventually the current master becomes a slave to the new module.

If an active board of a module is hot-swapped to the left of the existing master module 308, a voltage change corresponding to at least one position in its node position voltage will be detected by the slave modules to the left of the new module, except for the leftmost module 302. The resistor 310 of module 302 is already grounded in the backplane hardware, so that the opening and closing of NPA 312 for that Module I has no effect on the voltage $V_1$. Because of this special (leftmost) case, the NPA 312 cannot be relied on exclusively to cause a change in the Node Position Chain 303. The NPA has the effect of shorting the left-side of the resistor chain in a module to ground. Referring to FIG. 3, the leftmost module already has the left side of the resistor chain shorted to ground by circuitry on the wiring hub, which means that the NPA has no effect on leftmost module. Thus, if the NPA is solely relied on, an active board that has been inserted in the leftmost position will not be seen.

To account for this, a Node Sense Actuator 502 is provided in each module 302, 304, 306, 308. Each module's Node Sense Actuator 502 has two states: high impedance (i.e., for voltage reading) or driven low. In addition to activating the Node Position Actuator 312 on startup, modules will also activate the Node Sense Actuator 502. That will solve the leftmost module hot-swap problem.

By driving the Node Sense Actuator 502 low, any module (including the leftmost module) can change the voltage that any other module (such as the master) is measuring on its node position voltage (similar to the NPA). The NSA 502 effects the node position measurement by shorting out the current source to ground before it goes through that module's resistor in the backplane resistor change. At a minimum, that will cause the backplane voltage being monitored by any other module (to the right) to reduce by VPM.

Turning to FIG. 6, the process 600 for inserting a new module is shown. At Phase 0, a new module has just been inserted into the node 200 of FIG. 5, step 602. As part of its initialization sequence, the newly inserted module closes its NPA 312, and sets its Node Sense Actuator 502 low (i.e., closes the actuator 502). That combination of actions changes the voltage on line 303, thereby ensuring that the slave will be detected by the master.

The process turns to Phase 1, step 604, which is to determine whether the backplane is running. The newly inserted module will monitor the communications channel, looking for traffic. Since the node 200 is already running, it will detect the traffic, configure itself as a slave, and await further instructions from the master. In the meantime, the master is periodically monitoring the voltage on the Node Position Chain 303. Once the change is detected, the master will wait before acknowledging the insertion. That serves as a debounce, and gives the newly inserted module time to initialize. After that time has elapsed, the master will close its NPA 312, and broadcast a message to the other slaves in the node to re-initialize.

In phase 2, step 606, the node 200 needs to determine which module is the master module. Accordingly, the modules read their voltages, and the module with a voltage reading is determined to be the master module. Depending on the position of the newly inserted module, the existing master may or may not remain as master. The rest of the sequence behaves the same as the "power up" sequence 400 described earlier.

Current fluctuations (caused by changes in temperature, etc.) are accounted for by the master periodically closing its NPA and re-sampling the VPM. If during the re-sample the value is about zero, the master knows that an active board happened to be inserted to the right at the same time. In this case, the re-sampling is aborted and the module performs the standard hot-swap sequence as described above.

It should be noted that the underlying structure does not get removed in a hot-swap since the circuitry shown in FIGS. 3 and 5 are on the wiring hub boards in the module and are always present. On a hot-swap, only the attached active board (which is attached to the wiring hub circuitry of FIGS. 3 and 5) in the module is removed. The components most prone to need replacement are placed on the active board so only that board need by removed and replaced in the event of failure, while leaving the wiring hub board in place.

For illustrative purposes only, lets assume that modules 302, 306 and 308 currently have their active boards attached and running, and that the active board for module 304 is being hot-swapped into the node. We also assume that the Volts Per Module (VPM) measured by the master in 106 is equal to 2 volts. In the normal (non-startup or hot-swap) condition, all NPA 312 switches are open and the master module 308 will be measuring 8 volts on $V_4$ (module 308 is in position 4, so $V_4$=VPM*4). When the active board for module 304 is hot-swapped, it immediately activates its NPA 312 and NSA 502 switches. This causes $V_4$ to drop to 4 volts—the current flows from source 322 through resistor 310 in module 308 and module 306 down the NSA 502 in the newly inserted module 304. The master, seeing a drop of at least VPM/2, determines that an active board has been inserted into the node 200.

As another example, we again assume that the active boards for modules 302, 304, and 306 are in the node and running and that the active board for module 308 is being hot-swapped into the node. We also assume that the VPM measured by the master module at step 106 is equal to 2 volts. In the normal (non-startup or hot-swap) condition, all NPA 312 switches are open and the master module 306 is measuring 6 volts on $V_3$ (module 306 is in position 3, so $V_3$=VPM*3). When the active board for module 308 is hot-swapped, it immediately activates its NPA 312 and NSA 502 switches. This causes $V_3$ to drop to 0 volts since the current flows from the current source 322 down NSA 502 in the newly inserted module 308. Since the master sees a drop of at least VPM/2, it determines that something got inserted into the node 200. In addition, if that voltage drops to about zero, the master determines that a module got inserted to its right and the node will need to be reconfigured to determine the new setup and which module is the master.

Figure 7:
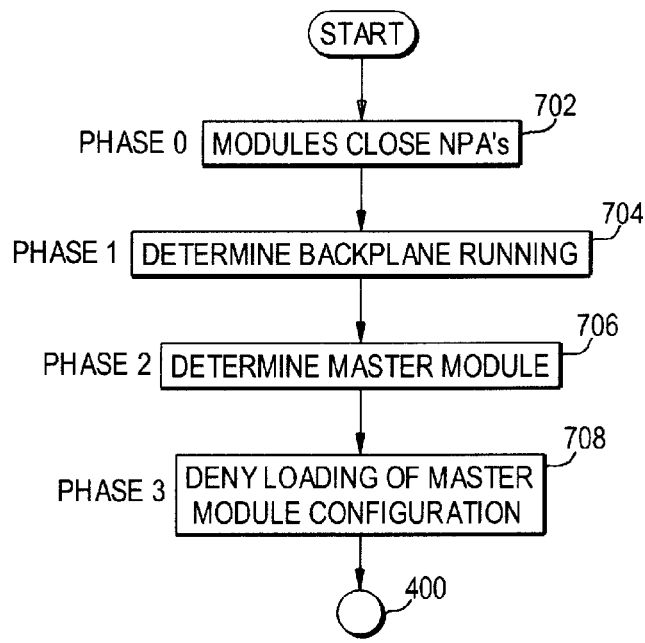
FIG. 7 is a flow diagram illustrating master module removal.

Master Module Removal, FIG. 7

For Master Module Removal, the slaves monitor all communications activity on the backplane so that they can respond to commands from the master. While doing so they also keep track of the last time there was any activity on the node 200. At a minimum, the master will periodically send a standard "Ping" message to the slaves. The ping messages accomplish several things: they let the slaves know that the master is still present, they let the master know the slaves are still present (since the slaves respond to pings), they allow the slaves to request to send an unscheduled message, and they provide status information. The slaves assume that the master has been removed if a period of inactivity occurs that is significantly longer than the retransmit delay associated with a ping message. When that happens, a backplane re-initialization will occur, step 400, so that one of the remaining slaves can assume the role as master.

The process 700 for removing a master module is shown in FIG. 7. At Phase 0, step 702, the modules have just determined that the master is not responding (i.e., that the slaves have not monitored any activity on the RS-485 communications channel, which the master controls and always has some traffic such as pings). The first thing that the slaves do is to close their Node Position Actuators 312, step 702, which is then followed by a delay. The delay is inserted to ensure that all modules have recognized that the master is missing and that they have closed their NPA. This delay will be dependent on processing speed, operating system thread priorities, and current processing load. The delay is critical as it gives time for all the other slave nodes to detect the failed master, and to close their NPAs 312, before continuing.

The system now enters Phase 1, step 704, where it determines whether the backplane is running. Since this sequence was started by recognizing that there was no activity on the backplane, this phase can be skipped. At Phase 2, step 706, the system determine which module is the master module. This process is nearly identically to step 408 of the "power up" sequence described earlier. Thus, the master is determined at step 706 by examining the node position chain 303. The only difference is the delay performed by the master. Since all modules should already be up and running, there doesn't need to be as much of a delay to wait for the slaves to reach this state.

Phase 3, step 708, is also almost identical to step 410 of the power-up sequence 400 described above. The only difference is the actions performed after initialization is complete. Since the new master already has its configuration loaded, it does not need to reload it at step 708.

Slave Module Removal

For Slave Module Removal, a failed or removed slave module has relatively little impact on the node. The master knows that the slave is failed/removed because it is not responding to communication requests, such as pings. The backplane does not need to re-initialize, as occurs when a master is removed. The master also knows the position of everything in the node 200 since, after normal startup is completed and the modules all know their positions in the node (each module ID is its position from left to right), the master queries each position to its left to see the make-up of the node. Since it already is determined that the master is the rightmost module, it will get to all the active modules in the device.

For example, if we assume that the master is in position 4, after startup it will query position 1, then 2, then finally 3 for information about each module. If a particular position does not respond to that query, then it is assumed that position does not contain a microprocessor based module (such as a power supply) or that the position contains a module that is failed or removed.

Accordingly, a slave can be removed from the node 200 without having any effect on the remaining modules. The remaining slave module positions will not change and the master remains the same. The only time the node is reconfigured in hot-swap is when the master is removed so the system can determine which module is the new master. The master takes note of a slave being removed and that information is available to the other slaves (via communications channel), if required.

Figure 8:
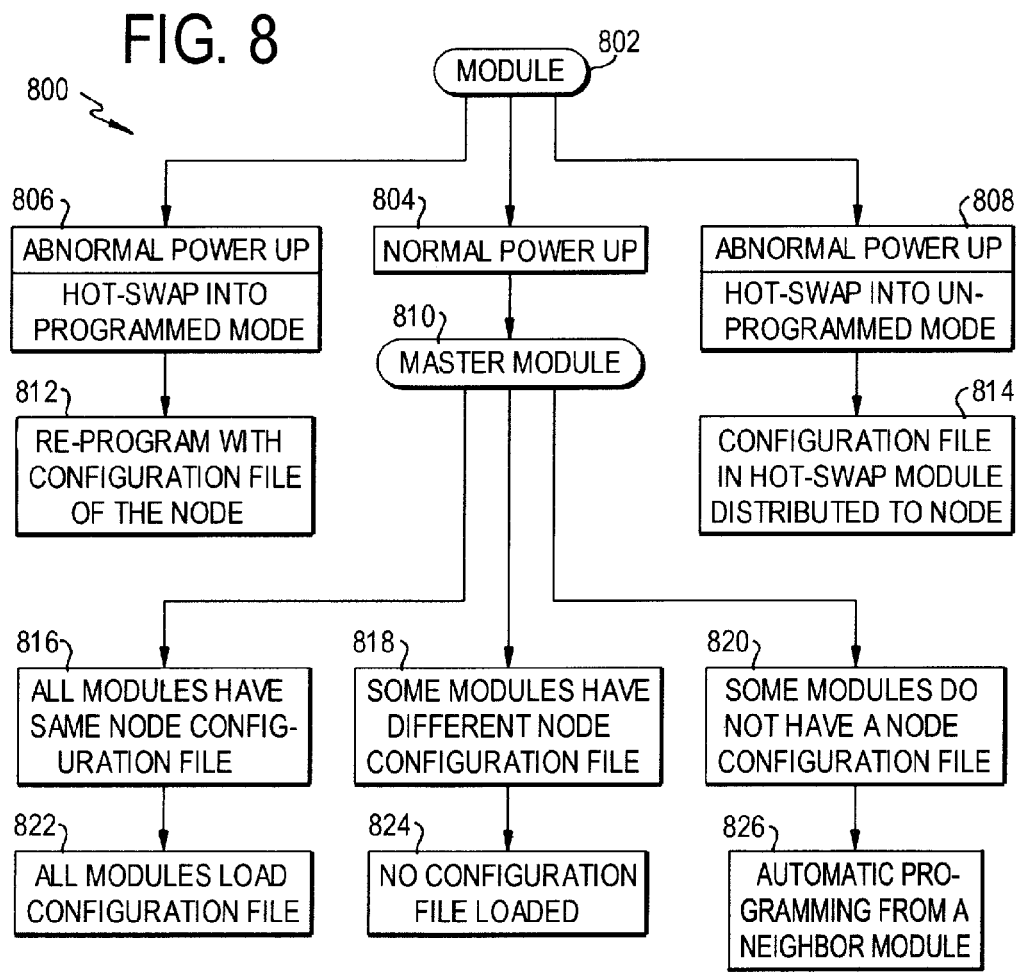
FIG. 8 is a block diagram illustrating module programming.

Automatically Programming Modules (112), FIG. 8

Having the ability to automatically program an active board when it is inserted into a node is a great advantage. It provides the ability to quickly recover from failures without the need to locate the correct program and associated programming software and hardware. The ease of replacement results directly in a reduced amount of training required for plant personnel and a reduced downtime for the plant in the face of equipment failure.

To accomplish this task, a node configuration file is distributed to every module on initial programming and stored in the module's non-volatile memory. The node configuration file includes the following: a node configuration file ID and version number; a description of what the physical makeup of the node should be (including the type and location of every module in the node); a block of data containing all of the programs used by each module in the node; and a block of stored data containing program variables, program parameters, etc. from all the programs used by each module in the node.

All of the modules in the node 200 can dynamically update their stored data block during program execution. This updated stored data block is periodically communicated to the other modules in the node to ensure that they all have the latest information that is contained in neighboring modules. Each module updates its stored data block in non-volatile memory periodically or on power removal. For instance, if a module is removed from the node and replaced with a new one, other modules in the mode will use the node configuration file (program and data) in their non-volatile memory and automatically program the new active board. Each microprocessor based module contains their own memory resources on the active board that stores this information.

FIG. 8 illustrates the process 800 of if and how the above-referenced configurations are loaded. During a normal power-up (i.e., the main power is activated and no hot-swapping occurs) of the modules 802, step 804, the master module compares the configurations of all of the modules, step 810. One of three situations will occur. At step 816, all of the modules will have the same node configuration file ID in their non-volatile memory and the physical makeup of the node matches what the node configuration file dictates. In this case, all of the modules will load and run this configuration at step 822.

The second situation is shown at step 818, where some modules will have different node configuration file IDs than others. This case is ambiguous and there is no clear-cut way to tell which configuration is "correct" and which one(s) aren't. Therefore, to be safe, no configuration is loaded at step 824. All of the modules retain the programs that are stored in them, even though they are different, but no programs are loaded and executed. The modules revert to a state as if they were not programmed and remain mainly idle and await user interaction to resolve the conflict. This can be resolved by removing modules with different programs from the node or reprogramming the node.

The third situation is that some of the modules in the node will not have a node configuration file in their non-volatile memory at step 820. The other modules in the node will have the same node configuration file in memory and it matches the physical makeup of the node. In that case, the modules that do not have a node configuration file will get automatically programmed from a neighbor module at step 826.

Returning to step 806, if an active board is hot-swapped into a node running a particular node configuration file, the newly inserted active board will be reprogrammed at step 812 with the configuration being run by the rest of the node. Put another way, the configuration being run by the node will always be deemed "correct", regardless of what is stored in the newly inserted board.

At step 808, if an active board is hot-swapped into a node that does not contain a module with a node configuration file, step 808, and the hot-swapped active board contains a valid node configuration file for the node, then the configuration stored in the hot-swapped board will be distributed to the other modules in the node at step 814.

Distributing Power (114)

Figure 9:
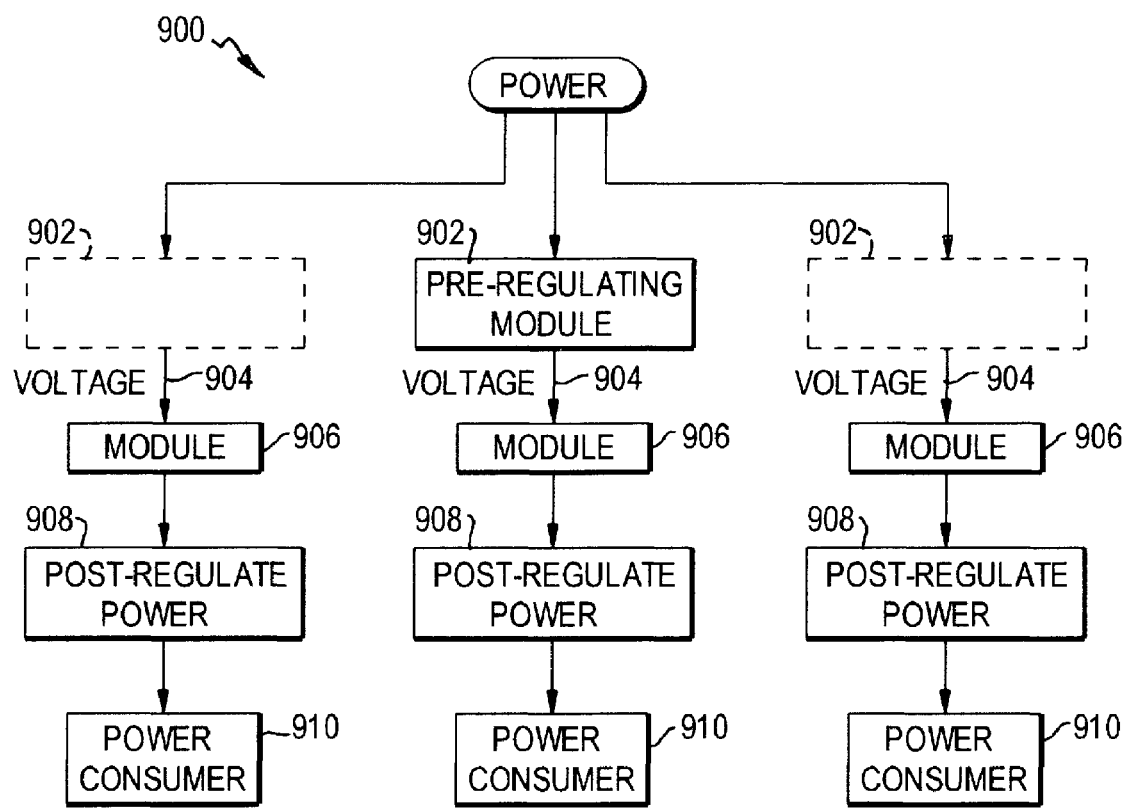
FIG. 9 is a flow diagram illustrating a mechanism for distributing power throughout the node.

Turning to FIG. 9, there are three main elements for distributing power 900 throughout the node: pre-regulating modules 902, post-regulating power 908, and power consumer 910. The pre-regulated power 904 is distributed along the backplane 205. Power enters the node 200 into one or more pre-regulating modules 902. These modules 902 then output a specified voltage 904 to modules 906 in the node 200. Essentially, one or more pre-regulating modules 902 take power from a variety of sources, such as AC power, DC power, Solar power, Battery power, etc., and create a common voltage 904 on the backplane. If there are more then one pre-regulators 902 in a node, they all generate power to a common bus voltage 904. The other modules 906 in the node 200 will post-regulate the power 904 at step 908 from the pre-regulator modules 902 and make the power available to power-consumers 910 specific to that module.

Separating the power into pre and post-regulation steps has several benefits. The power entering the node can be from many different types of sources (DC, AC, different voltages, frequencies, etc.) and the only thing that needs to change is the pre-regulating module. In addition, by separating the power distribution, a level of isolation is provided between power-consumers 910. For example, if a power-consumer 910 from one module 906 has a fault that shorts out the power, power from adjacent modules will not be affected as only the faulted module will lose regulation.

Multiple pre-regulating modules 902 can be added to the node 200 to provide power redundancy. In this case multiple redundant pre-regulating modules 902 can handle the full power requirements of the node 200. If any pre-regulator module 902 fails or is hot-swapped out of the node 200 then, the remaining one(s) will automatically provide uninterrupted power to the modules in the node 200. Multiple pre-regulating modules 902 can be added to the node 200 to provide power sharing. For example, assume that the node 200 requires 50 W of power. To supply this power, two 25 W pre-regulating modules can be added to the node 200.

A power status indication can also be transmitted to immediately adjacent modules on the left or right of a pre-regulating module 902 by a signal line on the backplane. That signal can be used in the case of multiple redundant pre-regulator modules 902 in a node 200 to indicate that one or more of the power sources are bad.

Portable Software Programs

Figure 10:
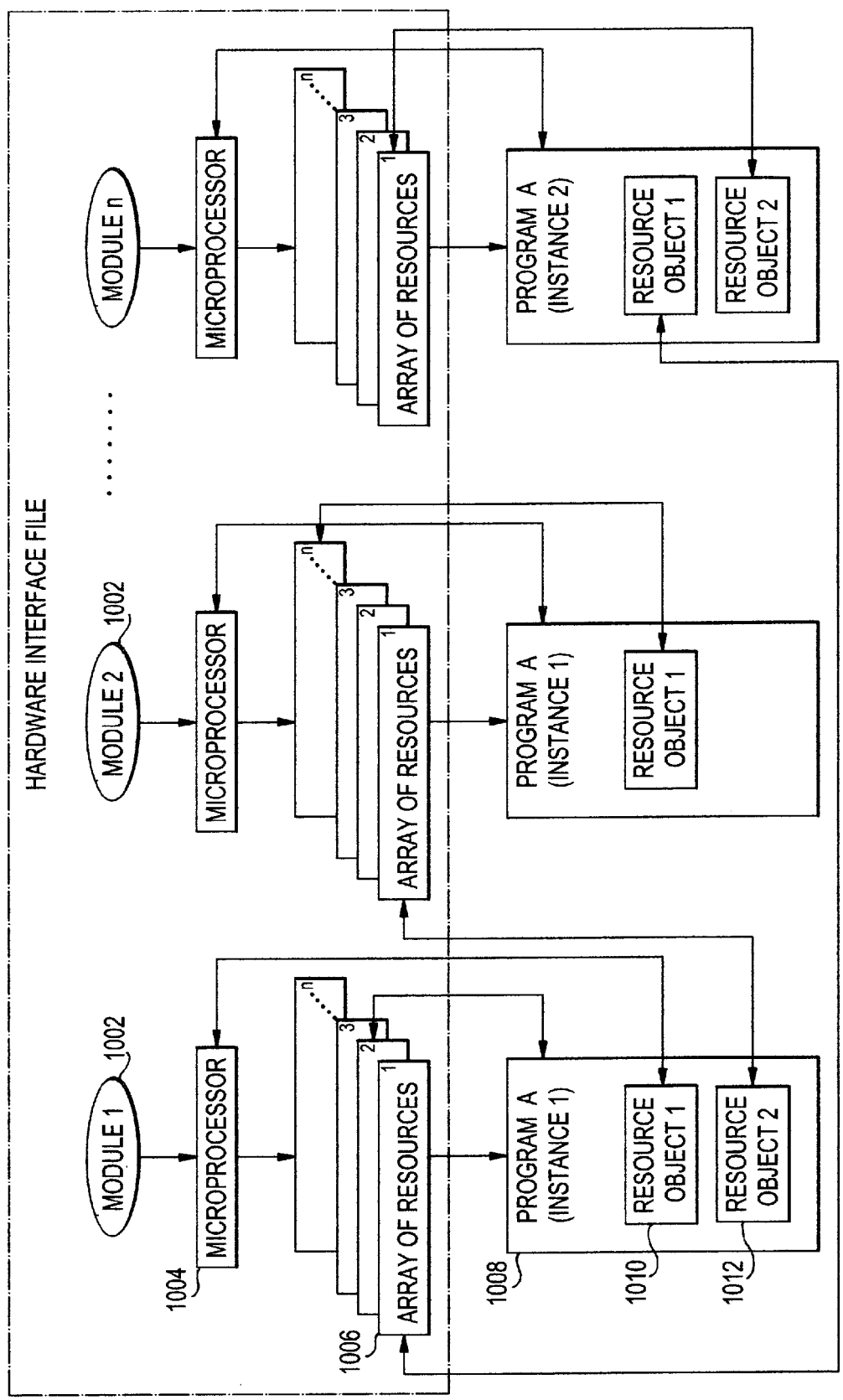
FIG. 10 is a flow diagram illustrating a mechanism for creating software programs.
Figure 11A:
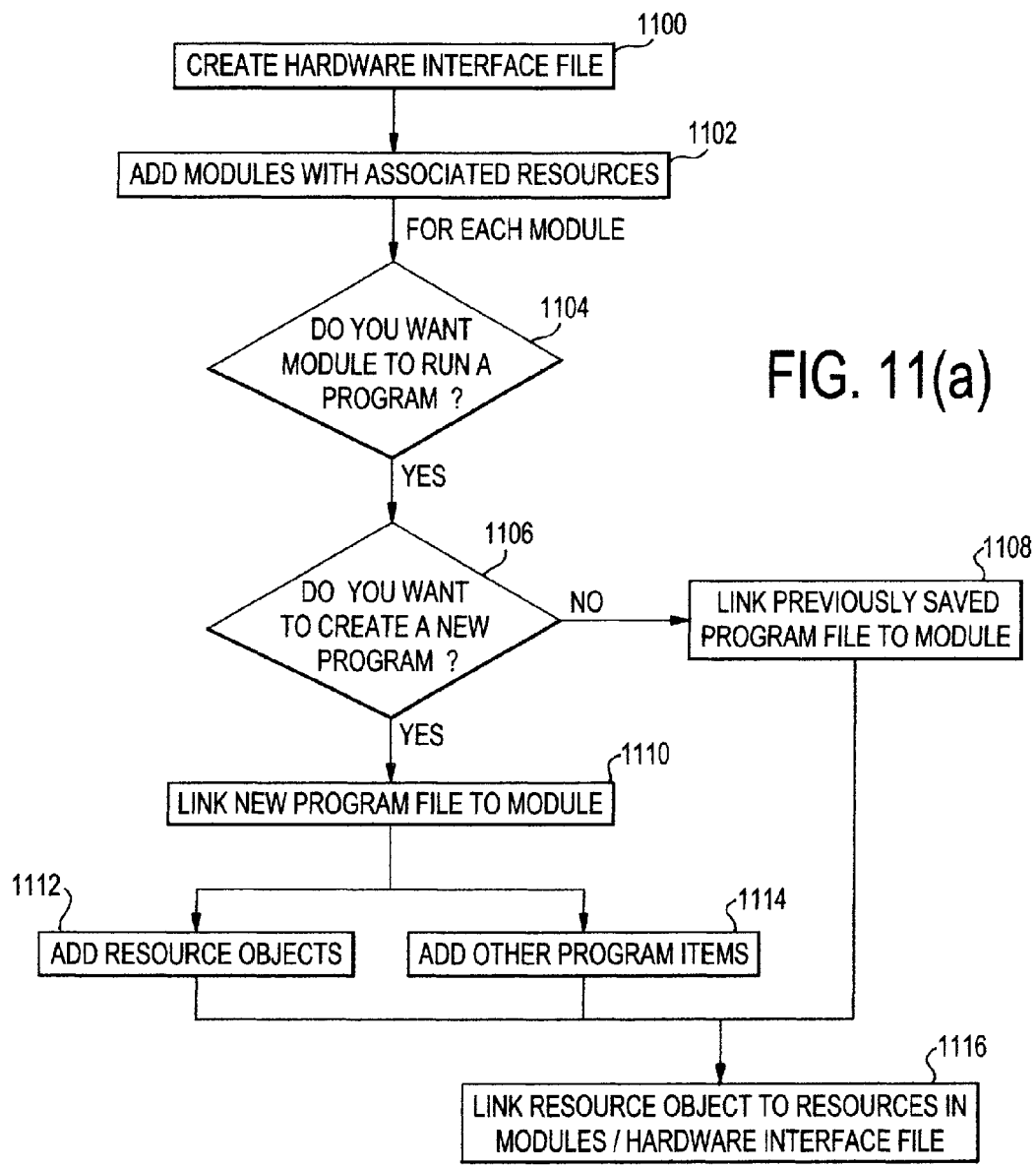
FIGS. 11(*a*) and (*b*) are flow charts for programs.
Figure 11B:
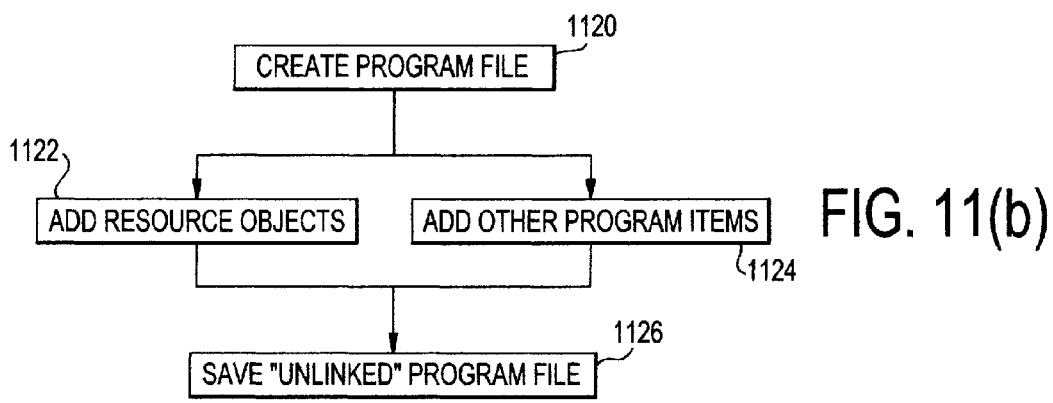

Turning to FIGS. 10 and 11, portable program files are provided across their hardware platforms and are completely independent from the hardware located on the target device. That is accomplished by allowing the user to create a program and generic hardware elements that are then both 'linked' in software to the specific hardware. These software connections are stored in a separate hardware configuration file.

In FIG. 10, a typical collection of resources (either in the microprocessor 1004 or resources 1006 that the microprocessor can link to) are shown contained in a system (such as a node of modules as well as a collection of devices connected via a network). Each module 1002 contains a microprocessor 1004 that can execute a program. Those microprocessors 1004 also have access to hardware and software resources 1006. Examples of hardware resources include analog inputs, digital outputs, displays, etc., and examples of software resources include networking broadcast and receiver signals, diagnostic information, etc. Each microprocessor 1004 in the figure can communicate to each other via a network.

Programs 1008 are shown that contain unlinked resource objects 1010, 1012. These resource objects represent a placeholder for eventual connections to actual hardware and software resources 1006. These programs 1008 are separate files and not specifically tied to any particular hardware configuration. At some point in the program creation process, these programs 1008 are linked to the microprocessors 1004, thereby indicating that the linked microprocessor should run the attached program. One program file can be linked to multiple microprocessors, as shown by Program A being linked to the microprocessor in module 1 and module n. In addition, each resource object 1010 and 1012 can then be linked to resources in that microprocessor 1006 or to resources that the microprocessor can have access to via a network connection.

FIGS. 11(a) and (b) show this process in greater detail. At step 1120, an unlinked program is created. The program contains place-holders to hardware and software resource that eventually need to be connected to and other common program items, step 1124, such as math operations, sub-functions, variables, etc. Finally, a debugged and tested program is stored in an unlinked state, ready to be connected to one or more microprocessors and it associated resources.

Step 1100 shows creation of a hardware interface file. This file contains information about the available microprocessor and hardware/software resources in the available system. In this particular example, the system is a node that modules can be added to, step 1102. For each microprocessor 1004 in the system, it must be decided if it should be running a program or be idle and just handle network communication access to its resources 1006, step 1104. If it is decided that the microprocessor should run a program, the user is presented with the option to create a new program or link to a previously created program, step 1106.

If the user wants to link a previously created program 1108, they can select an unlinked program from step 1126. If the user wants to create a new program, the process picks up with step 1110, 1112, and 1114 (similar to process 1120 of FIG. 11(*b*).) Once the program is linked (or created and linked), the user must link the place-holder resource objects to the actual resources, step 1116. This is done by selecting each place-holder resource and indicating which actual resource the place-holder is connected to. In accordance with a preferred embodiment, a graphical symbol that represents resource objects are provided in the programming software—the user right-clicks on these and selects "connect to hardware". Next, a window is presented that allows the user to select hardware in the hardware interface file to connect to. One of the important concepts here is that all the linked information is stored in the hardware interface file 1100. This allows the individual programs 1126 and/or those created via 1110, 1112, and 1114 to remain target independent.

Consider an example where there is a plant with 3 pumps that need to have their output pressure controlled. This control is accomplished by reading the pump output pressure using an analog input and sending an analog output control signal to a valve. Next, a pump control program 1008 is created, step 1120, that has resource objects, step 1122, as follows: an input place-holder resource object 1010 which represents the pump pressure read by an analog input and an output place-holder resource object 1012 which represents the analog output control signal to the valve. The program also contains other program elements that are added, step 1124, such as a PID algorithm and math operators which mathematically dictate how the valve should react given the current pump pressure.

The system designer decides that they would like to setup a controller that has three modules 1002, one module for each pump. A hardware interface file is then created, step 1100, that has three modules 1102 of the type selected. Each of these modules will be running the same pump control program created earlier, step 1104. This is specified by indicating that each microprocessor 1004 is linked, step 1108, to the pump control program 1008. Note that the same program is linked to each microprocessor 1004 in the three modules 1002. The last step, step 1116, to configure the system is to link the analog input pressure 1010 and analog output valve control signal 1012 to analog input and analog output resources in each module 1006 that the actual sensors and valves will connect to. If during system test it is discovered the pump control program needs to be changed, the change only needs to be done to the one pump control program and all three pumps will automatically get the change.

Separating out the hardware link information from the program file allows a user to reuse that same program on a different hardware platform. The main program will stay the same, but the link file changes for each instantiation. Other programming packages require the user to specify the hardware resource specifically in the hardware related function block.

This hardware-linking concept can be extended to a modular controller as well. In this case, one can allow the program to link to one or more modules. One can also allow a generic hardware element to not only link to hardware in the module the program is linked to, but to hardware located in any module in the node. This concept can be extended further in a networking environment to allow a generic hardware element to link to any hardware through the network. The generic hardware elements include, but are not limited, to be in the form of analog inputs, analog outputs, digital inputs, digital outputs, interface devices (displays, push buttons, etc.), and network connections.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for forming a control node, the method comprising:
    providing a plurality of modules, each module including an independently operating, user-programmable microprocessor and associated set of hardware resources, the microprocessor including a voltage inducing element, and a node position actuator coupled to one side of the voltage inducing element;
    connecting the modules so that the modules can communicate with one another;
    selecting a master module from the plurality of modules by manipulating the node position actuator of each of the plurality of modules so that a voltage forms across only one of the voltage inducing elements;
    identifying the module with the voltage across its voltage inducing element as the master module;
    identifying the remaining module(s) as slave module(s); and
    determining an address of each of the slave module(s).

2. The method of claim 1, further comprising detecting whether any one of the plurality of modules has been hot-swapped into or out of the control node.

3. The method of claim 1, further comprising automatically programming at least one of the plurality of modules.

4. The method of claim 1, further comprising distributing power to the plurality of modules.

5. The method of claim 1, wherein the step of selecting a master module includes sharing a single multi-drop serial channel amongst the plurality of modules.

6. The method of claim 5, further comprising allowing one of the plurality of modules to transmit at a designated time.

7. The method of claim 1, wherein the step of selecting a master module comprises selecting a module at an end of the plurality of modules in the control node as the master module.

8. The method of claim 1, wherein the step of selecting a master module from the plurality of modules further comprises the step of providing a node position chain by forming a voltage inducing chain by connecting the voltage inducing elements of each of the plurality of modules in series such that one end of the array is grounded, and a constant current source is connected to the opposite end of the array.

9. The method of claim 1, wherein the step of determining an address comprises sampling a voltage drop across the master module and providing the voltage drop to the slave modules.

10. The method of claim 1, wherein the step of determining an address further comprises using the voltage across the voltage inducing element of the master module to determine a Voltage Per Module; and determining the address based on a value derived from the Voltage Per Module/(I*R).

11. The method of claim 1, further comprising a backplane initialization:
manipulating the node position actuator for each module;
determining whether any module has been hot-swapped by monitoring a communication channel of a backplane for a predetermined period of time;
broadcasting a command from the master module to all other modules in the control node to determine their respective address; and
distributing a node configuration file from the master module to all remaining modules in the control node.

12. The method of claim 11, wherein the step of determining whether any module has been hot-swapped comprises:
monitoring a voltage at the master module to ascertain any change, wherein a node sense actuator is added to each of the plurality of modules and is used for detecting the voltage charge to a module corresponding to an address in the full left position of the control node;
detecting insertion of the master module after monitoring the voltage at the master module; and
detecting insertion of at least one other module after monitoring the voltage at the master module.

13. The method of claim 11, further comprising reinitializing the control node when a new master module is inserted.

14. The method of claim 1, further comprising:
distributing a node configuration file to every module in the control node on initial programming;
storing the node configuration file in non-volatile memory of each of the plurality of modules; and
employing the node configuration file in the plurality of modules and programming a newly added module.

15. The method of claim 1, further comprising:
introducing power into the control node via at least one pre-regulating module;
outputting a predetermined voltage from the at least one pre-regulating module to other modules in the control node; and
post-regulating the power from the at least one pre-regulating module using the other modules in the control node.

16. The method of claim 1, further comprising adding a plurality of pre-regulating modules to the control node and providing power redundancy and power sharing.

17. The method of claim 1, further comprising:
creating hardware-link information separate from a program file for a program for allowing a user to use the program on different hardware platforms, wherein the hardware-link information links the program to at least one module in the control node and links a generic hardware element to hardware in the at least one module to which the program is linked and to adjunct hardware located in other remaining modules in the control node.

18. A control node, comprising:
a plurality of modules, each module adapted to be in communication with another module and including an independently operating, user-programmable microprocessor, the microprocessor including a voltage inducing element, the voltage inducing elements of each of the plurality of microprocessors coupled to form a node position chain;
a node position actuator in each module coupled between an end of the voltage inducing element and a grounding point; and
a node sense actuator in each module coupled between another end of the resistive element and the grounding point,
wherein the node position actuator is manipulated for selecting a master module from the plurality of modules and identifying the remaining module(s) as slave module(s),
and wherein the node sense actuator is manipulated when determining the presence of a new slave module.

19. The control node of claim 18, wherein the node position chain is formed from coupling the voltage inducing elements in series.

20. The control node of claim 18, each of the plurality of modules including a means for determining a voltage at each of the plurality of modules, wherein each of the plurality of modules determines if it is a master module based on the voltage across that module.

21. The control node of claim 18, wherein one of the plurality of modules determines that it is the master module if there is a voltage at the module.

22. The control node of claim 18, wherein at least one of the plurality of modules determines that it is a slave module if there is no voltage at that module.

23. The control node of claim 18, wherein at least one of the plurality of modules is connected to a current source and at least one of the plurality of modules is connected to ground.

* * * * *